United States Patent
Hirono et al.

(10) Patent No.: US 12,480,881 B2
(45) Date of Patent: Nov. 25, 2025

(54) RAMAN SPECTROSCOPY ANALYSIS METHOD AND MICROSCOPIC RAMAN SPECTROSCOPY DEVICE

(71) Applicant: SHIMADZU CORPORATION, Kyoto (JP)

(72) Inventors: Kohei Hirono, Kyoto (JP); Yusuke Aoi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 86 days.

(21) Appl. No.: 18/685,903

(22) PCT Filed: Mar. 3, 2022

(86) PCT No.: PCT/JP2022/009071
§ 371 (c)(1),
(2) Date: Feb. 23, 2024

(87) PCT Pub. No.: WO2023/026523
PCT Pub. Date: Mar. 2, 2023

(65) Prior Publication Data
US 2024/0353337 A1 Oct. 24, 2024

(30) Foreign Application Priority Data
Aug. 26, 2021 (JP) .................................. 2021-138263

(51) Int. Cl.
*G01N 21/65* (2006.01)

(52) U.S. Cl.
CPC ... *G01N 21/65* (2013.01); *G01N 2201/06113* (2013.01)

(58) Field of Classification Search
CPC ............................................ G01N 2201/06113
See application file for complete search history.

(56) References Cited

U.S. PATENT DOCUMENTS

2020/0049627 A1\* 2/2020 Franjic .................. G01J 3/44

FOREIGN PATENT DOCUMENTS

JP 2006113021 4/2006

OTHER PUBLICATIONS

"International Search Report (Form PCT/ISA/210) and Written Opinion (Form PCT/ISA/237) of PCT/JP2022/009071", mailed on May 17, 2022, with English translation thereof, pp. 1-12.

(Continued)

*Primary Examiner* — Jamil Ahmed
(74) *Attorney, Agent, or Firm* — JCIPRNET (57) ABSTRACT

[Problem to be solved] An object of the present invention is to provide a Raman spectroscopy analysis method that identifies the number of irradiation times of laser light at which a sample to be analyzed is damaged by the laser light during multiple Raman spectroscopy measurements and performs structural analysis of the sample to be analyzed using data on Raman scattering light obtained when the sample to be analyzed is in an undamaged state.

[Solution] A Raman spectroscopy analysis method including: dispersing an obtained Raman scattering light; identifying an upper limit of the number of irradiation times at which the sample to be analyzed is not damaged from total scattering intensity in a specific wavenumber range, a ratio of the total scattering intensity in the specific wavenumber range for each time irradiation to the total scattering intensity in the specific wavenumber range for first time irradiation and a correlation coefficient; using Raman scattering light data up to the upper limit of the number of irradiation times.

11 Claims, 4 Drawing Sheets

(56) References Cited

OTHER PUBLICATIONS

"Search Report of Europe Counterpart Application", issued on Jul. 2, 2025, p. 1-p. 9.

* cited by examiner

Step 1: Laser light emitted from a laser light source is irradiated onto a sample to be analyzed using an objective optical element.

Step 2: Raman scattering light from the sample to be analyzed is obtained.

Step 3: The obtained Raman scattering light is dispersed to determine total scattering intensity in a specific wavenumber range.

Step 4: Steps 1 to 3 are repeated.

Step 5: A ratio of the total scattering intensity in the specific wavenumber range for each time irradiation to the total scattering intensity in the specific wavenumber range for first time irradiation is determined.

Step 6: A correlation coefficient between the total scattering intensity in the specific wavenumber range for the first time irradiation and the total scattering intensity in the specific wavenumber range for each number of irradiation times is determined.

Step 7: An upper limit of the number of irradiation times at which the sample to be analyzed is not damaged is identified from relationship between the number of measurements and at least one of the total scattering intensity for each number of irradiation times and the ratio of the total scattering intensity obtained in step 5 and relationship between the number of measurements and the correlation coefficient.

Step 8: Raman spectroscopy analysis is performed using Raman scattering light data up to the upper limit of the number of irradiation times identified in step 7.

RAMAN SPECTROSCOPY ANALYSIS METHOD AND MICROSCOPIC RAMAN SPECTROSCOPY DEVICE

CROSS-REFERENCE TO RELATED APPLICATION

This application is a 371 application of the International PCT application serial no. PCT/JP2022/009071, filed on Mar. 3, 2022, which claims the priority benefits of Japan Patent Application No. 2021-138263, filed on Aug. 26, 2021. The entirety of each of the above-mentioned patent applications is hereby incorporated by reference herein and made a part of this specification.

TECHNICAL FIELD

The present invention relates to a Raman spectroscopy analysis method and a microscopic Raman spectroscopy device.

RELATED ART

Raman spectroscopy is a measurement technique that realizes structural analysis of a sample by spectroscopically analyzing Raman scattering light of different wavelengths generated from the sample when irradiated with an excitation laser (for Patent example, Document 1). Particularly, microscopic Raman spectroscopy has been developed as a means of analyzing a chemical structure of a minute part and has been widely applied in recent years.

Since the Raman scattering light has extremely low intensity compared to laser light, it is necessary to use high-intensity laser light. In addition, since the intensity of the Raman scattering light is low, a S/N ratio of a spectrum obtained is also low. Therefore, it is necessary to obtain a high S/N ratio by irradiating the sample to be analyzed with the laser light multiple times, measuring the Raman scattering light multiple times, and accumulating those results.

However, if the intensity of the laser light is too strong or the number of accumulations is too large, the laser light will damage the sample to be analyzed. In particular, when the sample to be analyzed is an organic substance, the sample may be burnt out due to carbonization or thermal decomposition caused by laser light irradiation. In particular, in microscopic Raman spectroscopy, in which an extremely small area is the object of measurement, the area irradiated with the laser light concentrates on an extremely small area, so burnout of the sample to be analyzed becomes significant.

When the burnout of the sample occurs, the structure of the sample to be analyzed changes. As a result, Raman scattering light data based on the original structure cannot be obtained, and thus Raman scattering light must be measured again for accurate structural analysis.

However, since the structure of the burnt part is broken, it is not possible to obtain Raman scattering light that reflects the original structure even if the same location is measured.

PRIOR ART DOCUMENT

Patent Document

Patent Document 1: JP-A 2006-113021

SUMMARY OF THE INVENTION

Problem to be Solved by the Invention

Therefore, it is necessary to determine Raman scattering light data obtained before a sample to be analyzed is damaged by laser light during Raman spectroscopy measurements and to analyze structure of the sample to be analyzed only from Raman scattering light data before the sample is damaged.

An object of the present invention is to provide a Raman spectroscopy analysis method that identifies the number of irradiation times of laser light at which a sample to be analyzed is damaged by the laser light during multiple Raman spectroscopy measurements and performs structural analysis of the sample to be analyzed using data on Raman scattering light obtained when the sample to be analyzed is in an undamaged state.

Another object of the present invention is to provide a microscopic Raman spectroscopy device that performs the Raman spectroscopy analysis method.

Means for Solving the Problem

That is, the present invention provides a Raman spectroscopy analysis method comprising:
  irradiating a sample to be analyzed with laser light emitted from a laser light source using an objective optical element;
  obtaining Raman scattering light from the sample to be analyzed;
  dispersing the obtained Raman scattering light to determine total scattering intensity in a specific wavenumber range;
  repeating a process of determining the total scattering intensity in the specific wavenumber range from irradiation of the laser light multiple times;
  determining a ratio of the total scattering intensity in the specific wavenumber range for each time irradiation to the total scattering intensity in the specific wavenumber range for first time irradiation;
  determining a correlation coefficient between the total scattering intensity in the specific wavenumber range for the first time irradiation and the total scattering intensity in the specific wavenumber range for each number of irradiation times;
  identifying an upper limit of the number of irradiation times at which the sample to be analyzed is not damaged from
  relationship between the number of measurements and at least one of the total scattering intensity for each number of irradiation times and the ratio of the total scattering intensity in the specific wavenumber range for each time irradiation to the total intensity in the specific wavenumber range for the first time irradiation, and
  relationship between the number of measurements and the correlation coefficient; and
  using Raman scattering light data up to the upper limit of the number of irradiation times.

Further, the present invention provides a microscopic Raman spectroscopy device comprising:
  a laser light source;
  a microscopic optical unit;
  a plate for fixing a sample to be analyzed;
  a spectrometer; and
  a Raman scattering light detection system, the microscopic Raman spectroscopy device further comprising:
  a storage unit that stores the number of irradiation times of laser light and a Raman scattering light spectrum at that time, a calculation unit that calculates total scattering intensity of Raman scattering light in a specific wavenumber range for each laser light irradiation,
a calculation unit that determines a ratio of the total scattering intensity in the specific wavenumber range for each time irradiation to the total scattering intensity in the specific wavenumber range for the first time irradiation;
a calculation unit that determines a correlation coefficient between the total scattering intensity in the specific wavenumber range for the first time irradiation and the total scattering intensity in the specific wavenumber range for each number of irradiation times;
a display unit that displays
relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and
relationship between the number of measurements and the correlation coefficient; and
an analysis unit that identifies an upper limit of the number of irradiation times at which the sample to be analyzed is not damaged from
the relationship between the number of measurements and the at least one of the total scattering intensity for each number of irradiation times and the ratio of the total scattering intensity in the specific wavenumber range for each time irradiation to the total scattering intensity in the specific wavenumber range for the first time irradiation, and
the relationship between the number of measurements and the correlation coefficient.

Effects of the Invention

According to the present invention, there is provided a Raman spectroscopy analysis method that determines Raman scattering light data obtained before a sample to be analyzed is damaged by laser light during Raman spectroscopy measurements and can analyze structure of the sample to be analyzed only from the Raman scattering light data before the sample is damaged.

Further, according to the present invention, there is provided a microscopic Raman spectroscopy device that performs the Raman spectroscopy analysis method.

MODE FOR CARRYING OUT THE INVENTION

Figure 1:
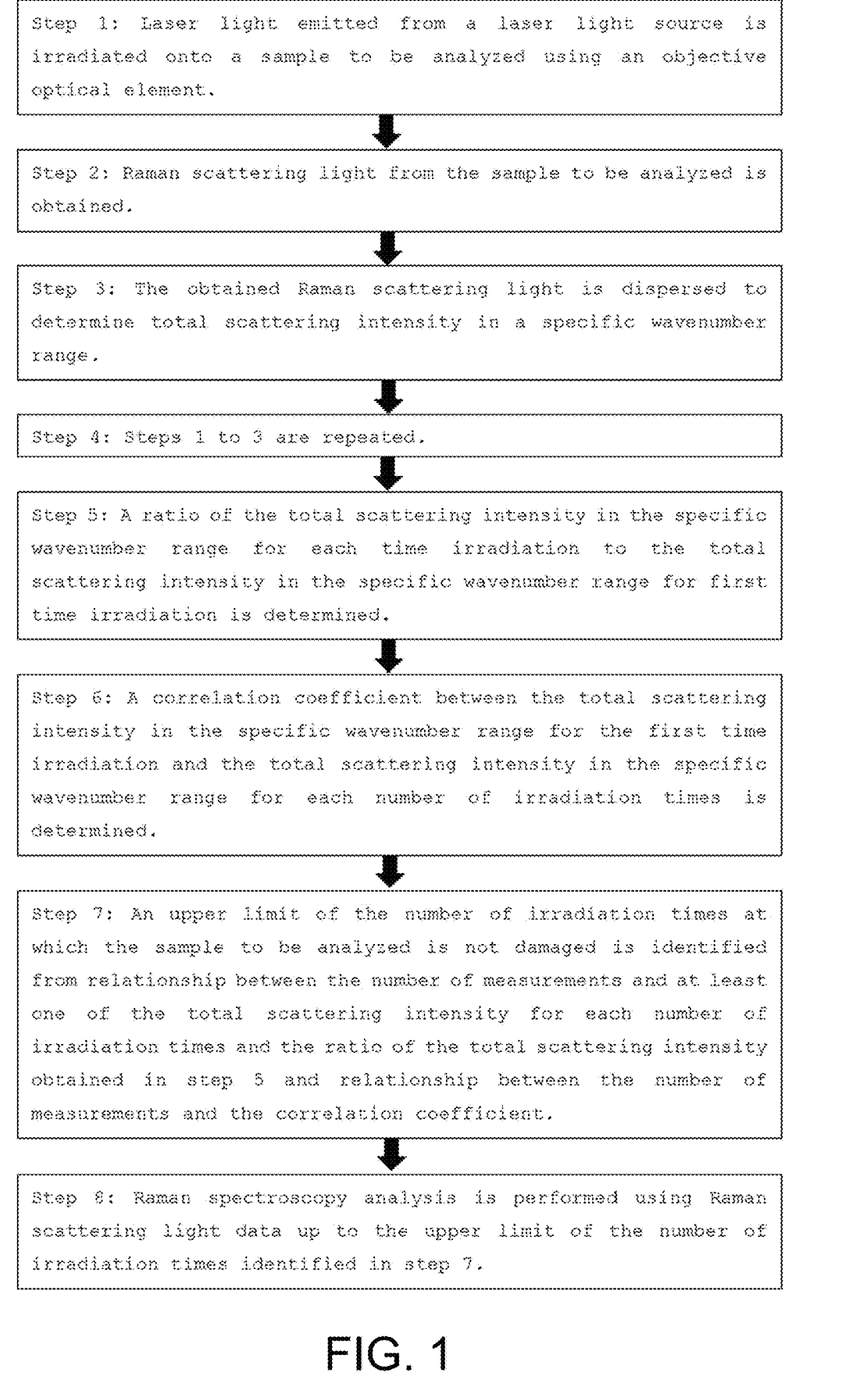
FIG. 1 is a flowchart showing a Raman spectroscopy analysis method of the present invention.

FIG. 1 is a flowchart showing a Raman spectroscopy analysis method of the present invention using a microscopic Raman spectroscopy device.

In steps 1 and 2, laser light is irradiated onto a desired region of a sample to be analyzed using an objective optical element to obtain Raman scattering light from the sample to be analyzed. By dispersing the obtained Raman scattering light, a Raman spectrum can be obtained as schematically shown in FIG. 2 with respect to wavelength or wavenumber.

Figure 2:
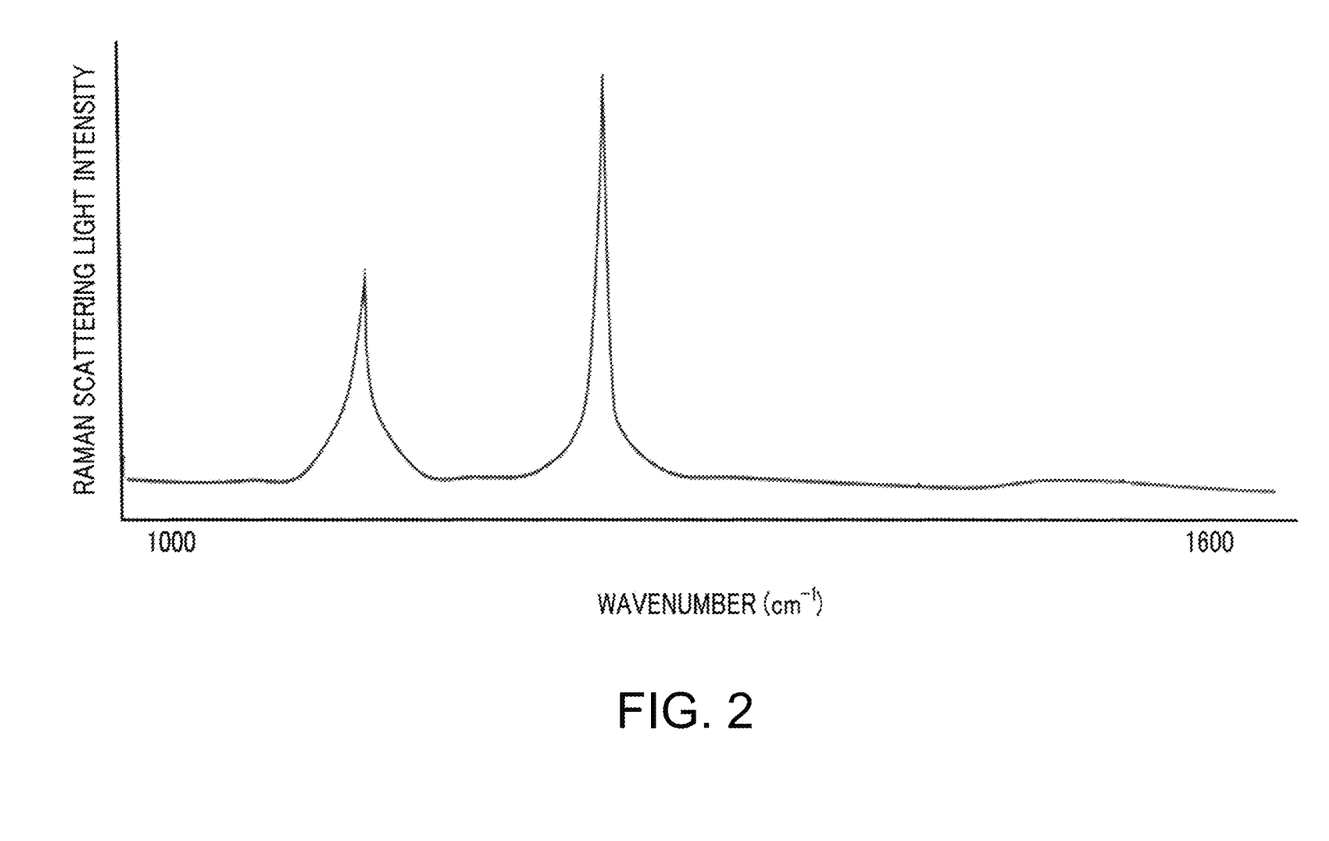
FIG. 2 is a schematic diagram of a Raman spectrum.

Usually, intensity of the Raman spectrum is very weak, so by repeating steps 1 to 3 multiple times, the spectrum as schematically shown in FIG. 2 can be obtained.

If steps 1 to 3 are repeated the multiple times, the sample to be analyzed becomes susceptible to damage such as decomposition, oxidation and burning by the laser light. Particularly if the sample to be analyzed is an organic substance, burnout may occur, and the damage caused by the laser light will be significant.

In addition, in the case of microscopic Raman analysis, since the objective optical element locally irradiates the laser light, burnout of the sample to be analyzed becomes significant.

Figure 3:
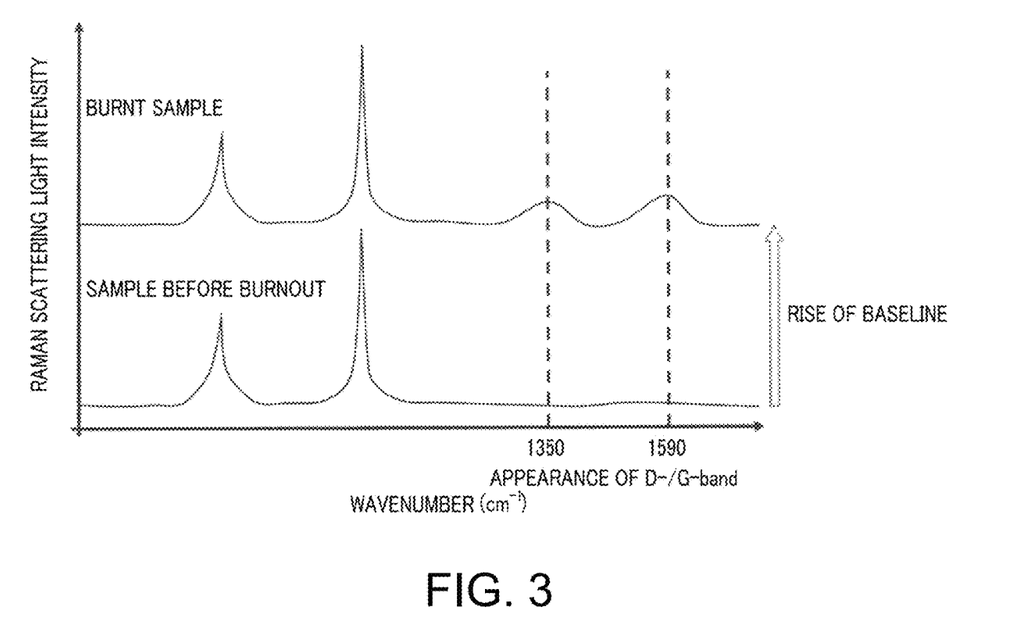
FIG. 3 is a schematic diagram showing change in the Raman spectra before and after a sample to be analyzed is damaged by laser light.

FIG. 3 schematically shows change in the Raman scattering spectra before and after the sample to be analyzed is burnt out by the laser light.

As shown in FIG. 3, when the sample to be analyzed suffers damage such as the burnout due to the laser light, a baseline of the Raman scattering spectrum rises. Further, when the sample to be analyzed is an organic substance, a D-band around 1350 $cm^{-1}$ and a G-band around 1590 $cm^{-1}$ appear due to carbonization. As a result, the originally obtained Raman scattering spectrum becomes small and broad, which may impede structural analysis.

Since the change in the Raman scattering spectra due to damage progresses gradually, it is difficult to determine how many times of irradiation of the laser light caused damage to the sample based solely on the change in the spectra. Furthermore, if it is found that the sample to be analyzed is damaged after Raman analysis, the analysis may become useless or the sample to be analyzed may need to be adjusted again.

If the number of irradiation times of the laser light that caused the damage can be specified, accurate analysis can be performed by using Raman scattering spectra up to the number of irradiation times that caused the damage. Further, there is no need for wasted analysis or readjustment of the sample to be analyzed.

Therefore, in the analysis method of the present invention, in step 3, total scattering intensity in a specific wavenumber range is determined in the Raman scattering spectrum obtained in step 2. It is not necessary to determine the total scattering intensity for all wavenumbers, and it is sufficient that the wavenumber range is the wavenumber of the spectrum expected to be possessed by the sample to be analyzed.

The total scattering intensity $S_n$ in the specific wave number range is determined. The total scattering intensity corresponds to an area surrounded by the spectrum a horizontal axis of the spectrum diagram in the specific wavenumber range. For example, when the Raman scattering intensity is expressed as an electric signal, the total scattering intensity is expressed as an integral of the total electric signal in the specific wavenumber range. Note that $S_n$ represents the total scattering intensity for the n-th time irradiation of the laser light.

In step 4, steps 1 to 3 are repeated to obtain $S_n$ for each time irradiation of the laser light. At this time, the number of irradiation times n and the total scattering intensity $S_n$ may be stored and recalled at an appropriate time, or n and $S_n$ may be displayed on a display device for each number of irradiation times.

Further, in step 5, an intensity ratio $s_n$ of $S_n$ to the total scattering intensity $S_1$ for the first time irradiation of the laser light is determined. $S_n$ is represented by the following formula (1).

$$s_n = S_n/S_1 \qquad (1)$$

In step 5, $S_n$ may be determined by calculations each time $S_n$ is determined in step 4, or $s_2$ to $s_n$ may be calculated all at once after the Raman spectroscopy measurements are completed.

In step 6, a correlation coefficient r between $S_1$ and each $S_n$ is determined. r is a coefficient used in statistical processing and is a value obtained by dividing a covariance by standard deviation.

The covariance is the value obtained by dividing the deviation of Sn by the number of measurements n, and the standard deviation is the square root of the sum of the squares of the differences between the average value of the total scattering intensity obtained by n times irradiation of the laser light and each $S_n$.

Similarly to n and $S_n$, $s_n$ and r may be stored so that they can be recalled at an appropriate time, or $s_n$ and r may be displayed on the display device at the same time as n and $S_n$ each time the irradiation is performed.

In step 7, an upper limit of n at which the sample to be analyzed is not damaged is determined from the relationship between Sn or sn and n and the relationship with r.

As shown in FIG. 3, when the sample to be analyzed is damaged, the baseline of the Raman scattering spectrum rises. That is, $S_n$ is constant until the sample to be analyzed is damaged, but after the sample is damaged, $S_n$ increases by the amount that the baseline rises. $s_n$ also increases after the sample to be analyzed is damaged. Therefore, if n at which $S_n$ or $s_n$ becomes large is specified, the immediately preceding n−1 becomes the upper limit number of times that the sample to be analyzed is not damaged.

Furthermore, as shown in FIG. 3, when the sample to be analyzed is the organic substance, the D-band around 1350 $cm^{-1}$ and the G-band around 1590 $cm^{-1}$ appear due to the carbonization. As a result, while $S_n$ or $s_n$ increases as shown by rise in the baseline, r decreases due to the influence of a new peak that appears due to the burnout or the like.

Therefore, by specifying n at which r becomes small, it is possible to specify n at which the organic substance has been damaged by the burnout. The immediately preceding n−1 becomes the upper limit number of times that the sample to be analyzed is not burnt out.

The relationship between n and $S_n$ or $s_n$ and the relationship between n and r can be determined by recalling and comparing each n, $S_n$, $s_n$ and r whose numerical values have been stored so far. This makes it possible to identify the upper limit of the number of times that the sample to be analyzed is not damaged. When $S_n$ or $s_n$ is plotted against n and r is plotted against n, it becomes easier to understand visually.

Figure 4:
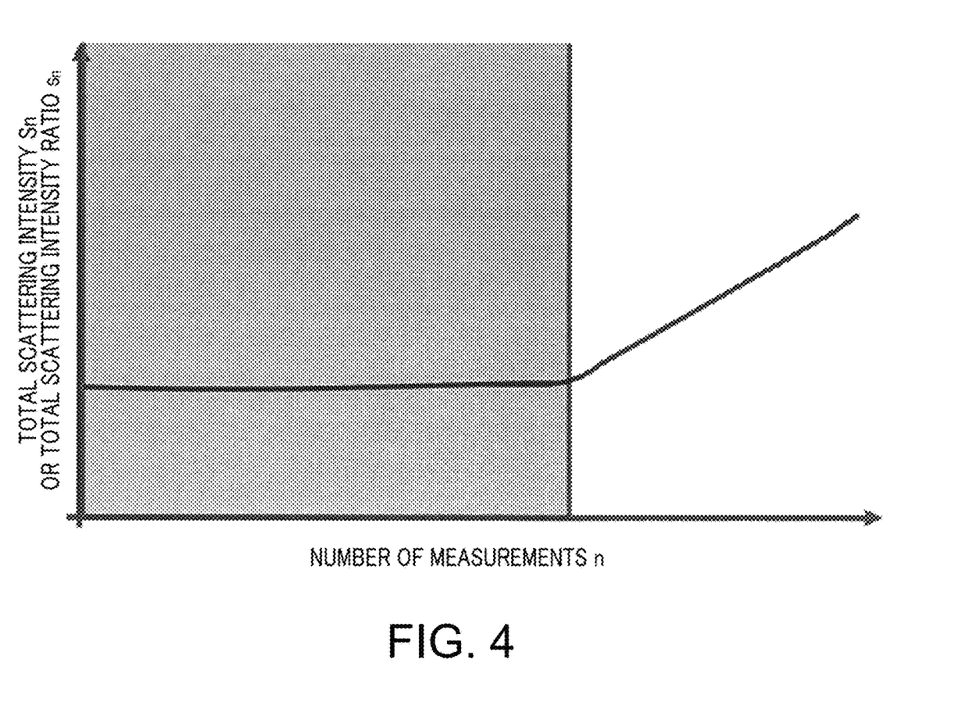
FIG. 4 is a schematic diagram when Sn or $s_n$ is plotted against n.
Figure 5:
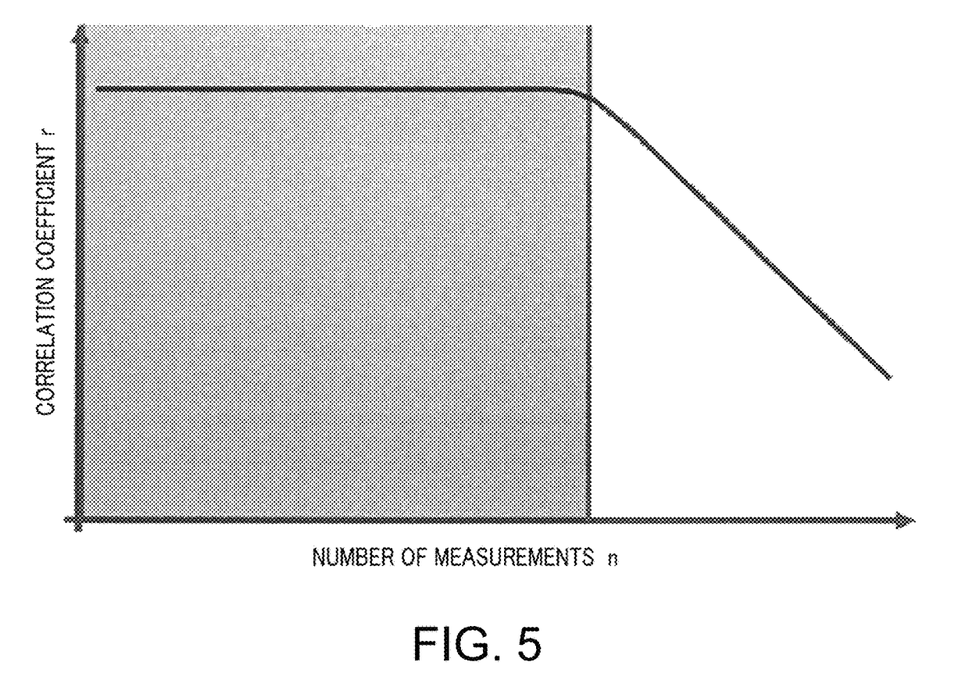
FIG. 5 is a schematic diagram when r is plotted against n.

FIGS. 4 and 5 schematically show results when $S_n$ or $s_n$ is plotted against n and r is plotted against n.

As shown in FIG. 4, when $S_n$ or $s_n$ is plotted against n, the value of $S_n$ or $s_n$ increases for a certain n. When connecting each point with a straight line, n appears where the straight line that was parallel to the x-axis changes upward to the right. This n is the number of irradiation times of the laser light at which the sample to be analyzed was damaged.

Further, as shown in FIG. 5, when r is plotted against n, the value of r becomes small for a certain n. When connecting each point with a straight line, n appears where the straight line that was parallel to the x-axis changes downward to the right. This n is the number of times a new peak appears due to the burnout or the like in the sample to be analyzed and is the number of irradiation times of the laser light at which the sample to be analyzed was burnt out.

That is, when the sample to be analyzed is damaged, there is n where the value of $S_n$ or $s_n$ becomes large. Therefore, $S_n$ and the previous $S_{n-1}$, or $s_n$ and the previous $s_{n-1}$ are compared to find n such that relationship of $S_{n-1} < S_n$ or $s_{n-1} < s_n$ is satisfied. This makes it possible to determine the number of irradiation times of the laser light at which the sample to be analyzed is burnt out and identify the upper limit of the number of times at which the sample to be analyzed is not burnt out.

Alternatively, a certain threshold value d is determined in advance, and n such that relationship of $S_n - S_{n-1} \geq d$ or $s_n - s_{n-1} \geq d$ is satisfied is determined as the number of irradiation times of the laser light at which the sample to be analyzed is burnt out, and the upper limit of the number of times at which the sample to be analyzed is not burnt out may be identified.

Note that FIGS. 4 and 5 schematically show the results when $S_n$ or $s_n$ is plotted against the aforementioned n and r is plotted against n, and the changes may be very small in some cases. Therefore, it is preferable to identify the upper limit number of times at which the sample to be analyzed is not damaged based on the change in the slope of the straight line by linear regression analysis of the plot of $S_n$ or $s_n$ against n and the plot of r against n because the number of times can be determined more accurately.

If the number n of irradiation times of the laser light at which the sample to be analyzed is damaged is determined by the method described above, the irradiation up to the (n−1)-th time can be identified as the number of irradiation times of the laser light at which the sample to be analyzed is not damaged. Therefore, by performing structural analysis of the sample to be analyzed using data up to the (n−1)-th time, accurate analysis becomes possible.

As described above, if each n and its Raman scattering spectrum are stored, it is sufficient to recall and analyze the Raman scattering spectra up to the upper limit of the number of irradiation times of the laser light at which the sample to be analyzed is not damaged, which is identified above.

Figure 6:
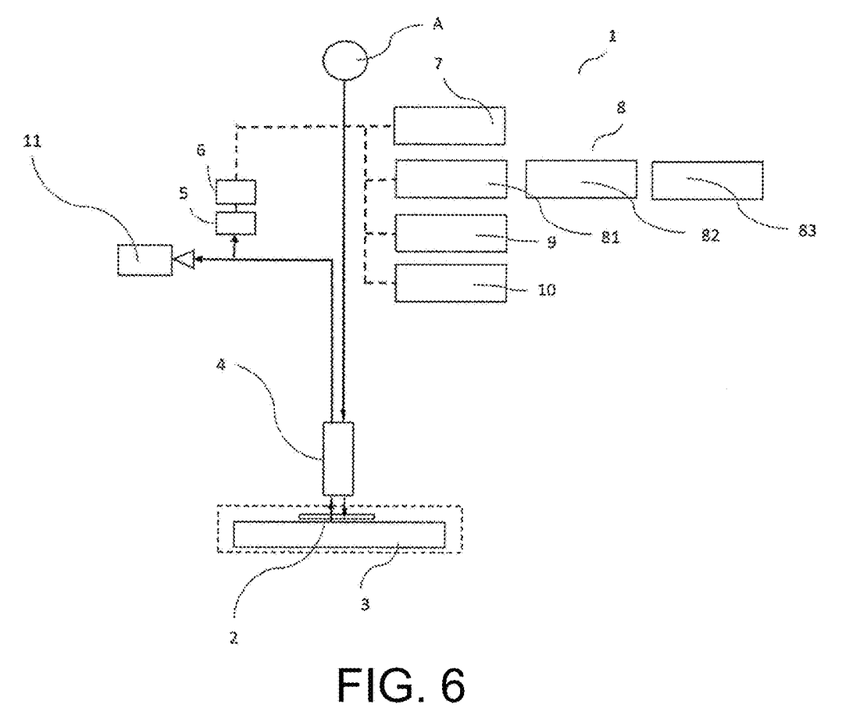
FIG. 6 is a schematic diagram showing one embodiment of a microscopic Raman spectroscopy device of the present invention.

FIG. 6 shows a schematic diagram of an embodiment of a microscopic Raman spectroscopy device for carrying out the above analysis method.

The microscopic Raman spectroscopy device shown in FIG. 6 includes a laser light source A, a microscopic optical unit 4, a plate 2 for fixing the sample to be analyzed, a spectrometer 5 and a Raman scattering light detection system 6. FIG. 6 further includes, as a preferred embodiment, a stage 3 for fixing the plate 2 and an optical imaging element 11 for displaying an image of the analysis field.

Furthermore, the microscopic Raman spectroscopy device of the present invention includes:
  a storage unit 7 that stores the number of irradiation times of the laser light and the Raman scattering light spectrum at that time,
  a calculation unit 81 that calculates the total scattering intensity of the Raman scattering light in the specific wavenumber range for each laser light irradiation, a calculation unit 82 that determines the ratio of the total scattering intensity in the specific wavenumber range for each time irradiation to the total scattering intensity in the specific wavenumber range for the first time irradiation;

a calculation unit 83 that determines the correlation coefficient between the total scattering intensity in the specific wavenumber range for the first time irradiation and the total scattering intensity in the specific wavenumber range for each number of irradiation times;

a display unit 9 that displays relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and relationship between the number of measurements and the correlation coefficient; and an analysis unit 10 that identifies the upper limit of the number of irradiation times at which the sample to be analyzed is not damaged from the relationship between the number of measurements and the at least one of the total scattering intensity for each number of irradiation times and the ratio of the total scattering intensity in the specific wavenumber range for each time irradiation to the total scattering intensity in the specific wavenumber range for the first time irradiation, and the relationship between the number of measurements and the correlation coefficient.

The laser light source A is a light source that irradiates the laser light for obtaining the Raman scattering light.

An example of the microscopic optical unit 4 is a configuration in which an objective lens (not shown) that is a combination of a convex lens and a concave lens is used as the objective optical element (not shown). The light incident on the microscopic optical unit 3 is focused onto the sample to be measured fixed on the plate 2 by these objective optical elements.

The Raman scattering light reflected by the sample are guided to the spectrometer 5 and the Raman scattering light detection system 6 via a condensing lens (not shown) and a condensing spot (not shown). The Raman scattering light condensed by the condensing lens is focused on the condensing spot and guided to the spectrometer 5.

At this time, it is preferable from the viewpoint of resolution that the microscopic optical unit 4 is a confocal optical system in which the positions of the light source A, the plate 2 and the focused spot are in a conjugate relationship.

The optical imaging element 11 is, for example, a CCD (Charge Coupled Device) image sensor or a CMOS (Complementary Metal Oxide Semiconductor) image sensor, and is configured to be able to capture still images or moving images of the sample. The optical imaging element can capture all or at least any of the bright field image, dark field image, phase contrast image, fluorescence image, polarized light microscope image, and the like of the sample depending on the configuration of the microscopic optical section 4 and the transmitted illumination (not shown). The optical imaging element outputs the captured image to another information processing device or the like, if necessary.

The microscopic Raman spectroscopy device of the present invention includes the storage unit 7 that stores the number of irradiation times of the laser light n and the Raman scattering light spectrum at that time Wn. The storage unit 7 is configured not only to store the values of n and Wn, but also to be able to be recalled when necessary. It is preferable that the storage unit 7 stores n and Wn as a set of data.

The microscopic Raman spectroscopy device of the present invention includes the calculation unit 81, which is a part of the calculation unit 8, that calculates the total scattering intensity $S_n$ of Raman scattering light in the specific wave number range for each laser light irradiation. The method of determining $S_n$ is as described above, and the calculation unit 81 is configured to calculate the $S_n$.

Further, the microscopic Raman spectroscopy device of the present invention includes the calculation unit 82, which is a part of the calculation unit 8, that calculates the ratio $S_n$ of $S_n$ to $S_1$, and the calculation unit 83, which is a part of the calculation unit 8, that calculates the correlation coefficient r between $S_1$ and $S_n$.

The calculation units 81 to 83 may be the same calculation device or may be independent calculation devices.

The method for calculating $s_n$ and r is as described above. $S_n$, $s_n$ and r obtained by the calculation unit 8 may be sent to the storage unit 7 and stored therein. When storing, it is preferable to store the previously stored n, $S_n$ and $s_n$ as a set. It is also preferable that the stored $S_n$ and $s_n$ may be configured so that they can be recalled when necessary.

The relationship between at least one of $S_n$ or $s_n$ obtained by the calculation unit and the 8 number of measurements n and the relationship between n and r are displayed on the display unit 9. Examples of displaying methods include a method of displaying $S_n$ or $s_n$ corresponding to n, and n and r as a set, and a method of displaying $S_n$ or $s_n$, and r as a set against n, or the like. However, as described above, it is preferable to plot and display $S_n$ or $s_n$ against n and r against n.

For example, if the diagram such as that schematically shown in FIG. 4 or 5 is displayed, it is visually easy to understand, and it is easy to determine the number of irradiation times at which the sample to be analyzed is damaged by the laser light.

Furthermore, the microscopic Raman spectroscopy device of the present invention includes the analysis unit that identifies the upper limit of the number of irradiation times at which the sample to be analyzed is not damaged from the relationship between at least one of $S_n$ or $s_n$ obtained by the calculation unit 8 and the number of measurements n and the relationship between n and r.

The method for identifying the upper limit of the number of irradiation times of the laser light without damaging the sample to be analyzed in the analysis unit 10 is as described above. The upper limit of the number of irradiation times of the laser light without damaging the obtained sample to be analyzed may be displayed on the display unit 9. For example, the range of the number of irradiation times of the laser light in which the sample to be analyzed is not damaged may be displayed together with the plot of $S_n$ or $s_n$ against n or the plot of r against n displayed on the display unit 9.

As mentioned above, by displaying on the display unit 9 the range of the number of irradiation times of the laser light in which the sample to be analyzed is not damaged in addition to the plot of Sn or sn against n or the plot of r against n, the range can be selected on the screen of the display unit 9.

By selecting the range on the screen of display unit 9, the storage unit 7, the display unit 9 and the analysis unit 10 may be linked such that n, the Raman scattering spectrum and Wn corresponding to the range of n that is not damaged by the laser light can be recalled from the storage unit 7 that stores Wn. The selection method may be such that Raman scattering spectra that are less than or equal to the upper limit of the number of irradiation times of the laser light in which the sample to be analyzed is not damaged, specified by the analysis unit 10, may be automatically recalled from the storage unit 7. Further, the data may be recalled from the storage unit 7 by an analyst specifying an area on the screen of the display unit 9 using a mouse or a keyboard.

When the analyst selects the range, it is not necessary to specify the (n−1)-th time specified by the analysis unit 10, and the range may be selected at the analyst's discretion.

By using the microscopic Raman spectroscopy device, it is possible to determine the Raman scattering light data obtained before the sample to be analyzed is damaged by the laser light during Raman spectroscopy measurements and analyze structure of the sample to be analyzed only from the Raman scattering light data before the sample is damaged.

According to the Raman spectroscopy analysis method of the present invention, it is possible to determine the Raman scattering light data obtained before the sample to be analyzed is damaged by the laser light during Raman spectroscopy measurements and analyze structure of the sample to be analyzed only from the Raman scattering light data before the sample is damaged.

Further, according to the present invention, there is provided the microscopic Raman spectroscopy device that performs the Raman spectroscopy analysis method.

Aspect

It will be understood by those skilled in the art that the multiple exemplary embodiments described above are specific examples of the following aspects.

[1] A Raman spectroscopy analysis method comprising:
irradiating a sample to be analyzed with laser light emitted from a laser light source using an objective optical element;
obtaining Raman scattering light from the sample to be analyzed;
dispersing the obtained Raman scattering light to determine total scattering intensity in a specific wavenumber range;
repeating a process of determining the total scattering intensity in the specific wavenumber range from irradiation of the laser light multiple times;
determining a ratio of the total scattering intensity in the specific wavenumber range for each time irradiation to the total scattering intensity in the specific wavenumber range for first time irradiation;
determining a correlation coefficient between the total scattering intensity in the specific wavenumber range for the first time irradiation and the total scattering intensity in the specific wavenumber range for each number of irradiation times;
identifying an upper limit of the number of irradiation times at which the sample to be analyzed is not damaged from
relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and
relationship between the number of measurements and the correlation coefficient; and
using Raman scattering light data up to the upper limit of the number of irradiation times.

According to the present invention according to the item [1], there is provided the Raman spectroscopy analysis method that determines Raman scattering light data obtained before a sample to be analyzed is damaged by laser light during Raman spectroscopy measurements and can analyze structure of the sample to be analyzed only from the Raman scattering light data before the sample is damaged.

[2] The Raman spectroscopy analysis method according to the item [1], wherein the number of measurements and at least one of the total scattering intensity for each number of irradiation times and the ratio of the total scattering intensity in the specific wavenumber range for each time irradiation to the total scattering intensity in the specific wavenumber range for the first time irradiation are plotted.

[3] The Raman spectroscopy analysis method according to the item [1] or [2], wherein the number of measurements and the correlation coefficient are plotted.

[4] The Raman spectroscopy analysis method according to the item [2], wherein linear regression analysis is performed on a plot of the number of measurements and at least one of the total scattering intensity for each number of irradiation times and the ratio of the total scattering intensity in the specific wavenumber range for each time irradiation to the total scattering intensity in the specific wavenumber range for the first time irradiation, and the upper limit of the number of irradiation times at which the sample to be analyzed is not damaged is identified from the number of measurements at which slope changes.

[5] The Raman spectroscopy analysis method according to the item [4], wherein linear regression analysis is performed on a plot of the number of measurements and the correlation coefficient, and the upper limit of the number of irradiation times at which the sample to be analyzed is not damaged is identified from the number of measurements at which slope changes.

According to the present inventions according to the items [2] to [5], it becomes possible to more easily determine the Raman scattering light data obtained before the sample to be analyzed is damaged by the laser light during Raman spectroscopy measurements.

It will also be understood by those skilled in the art that the exemplary embodiments described above are specific examples of the following aspects.

[6] A microscopic Raman spectroscopy device comprising:
a laser light source;
a microscopic optical unit;
a plate for fixing a sample to be analyzed;
a spectrometer; and
a Raman scattering light detection system, the microscopic Raman spectroscopy device further comprising:
a storage unit that stores the number of irradiation times of laser light and a Raman scattering light spectrum at that time,
a calculation unit that calculates total scattering intensity of Raman scattering light in a specific wavenumber range for each laser light irradiation,
a calculation unit that determines a ratio of the total scattering intensity in the specific wavenumber range for each time irradiation to the total scattering intensity in the specific wavenumber range for the first time irradiation;

a calculation unit that determines a correlation coefficient between the total scattering intensity in the specific wavenumber range for the first time irradiation and the total scattering intensity in the specific wavenumber range for each number of irradiation times;

a display unit that displays
  relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and
  relationship between the number of measurements and the correlation coefficient; and an analysis unit that identifies an upper limit of the number of irradiation times at which the sample to be analyzed is not damaged from
  the relationship between the number of measurements and the at least one of the total scattering intensity for each number of irradiation times and the ratio of the total scattering intensity in the specific wavenumber range for each time irradiation to the total scattering intensity in the specific wavenumber range for the first time irradiation, and
  the relationship between the number of measurements and the correlation coefficient.

According to the present invention according to the item [6], there is provided the microscopic Raman spectroscopy device which allows easy Raman spectroscopy analysis that determines Raman scattering light data obtained before a sample to be analyzed is damaged by laser light during Raman spectroscopy measurements and can analyze structure of the sample to be analyzed only from the Raman scattering light data before the sample is damaged.

[7] The microscopic Raman spectroscopy device according to the item [6], wherein the display unit plots and displays the number of measurements and at least one of the total scattering intensity for each number of irradiation times and the ratio of the total scattering intensity in the specific wavenumber range for each time irradiation to the total scattering intensity in the specific wavenumber range for the first time irradiation.

[8] The microscopic Raman spectroscopy device according to the item [6] or [7], wherein the display unit plots and displays the number of measurements and the correlation coefficient.

[9] The microscopic Raman spectroscopy device according to any one of the items [6] to [8], wherein the analysis unit performs linear regression analysis of a plot of the number of measurements and at least one of the total scattering intensity for each number of irradiation times and the ratio of the total scattering intensity in the specific wavenumber range for each time irradiation to the total scattering intensity in the specific wavenumber range for the first time irradiation to identify the upper limit of the number of irradiation times at which the sample to be analyzed is not damaged.

[10] The microscopic Raman spectroscopy device according to any one of the items [6] to [9], wherein the analysis unit performs linear regression analysis of a plot of the number of measurements and the correlation coefficient to identify the upper limit of the number of irradiation times at which the sample to be analyzed is not damaged.

[11] The microscopic Raman spectroscopy device according to any one of the items [6] to further having a function to recall and display the Raman scattering spectrum of the number of irradiation times at which the sample to be analyzed is not damaged from the storage unit.

According to the present inventions according to the items [7] to [11], there is provided the microscopic Raman spectroscopy device that can more easily determine the Raman scattering light data obtained before the sample to be analyzed is damaged by the laser light during Raman spectroscopy measurements.

DESCRIPTION OF REFERENCES

1: Microscopic Raman spectroscopy device
2: Plate
3: Stage
4: Microscopic optical unit
5: Spectrometer
6: Raman scattering light detection system
7: Storage unit
8: Calculation unit
81: Calculation unit
82: Calculation unit
83: Calculation unit
9: Display unit
10: Analysis unit
11: Optical imaging element
A: Laser light source

What is claimed is:

1. A Raman spectroscopy analysis method comprising:
irradiating a sample to be analyzed with laser light emitted from a laser light source using an objective optical element;
obtaining Raman scattering light from the sample to be analyzed;
dispersing the obtained Raman scattering light to determine total scattering intensity in a specific wavenumber range;
repeating a process of determining the total scattering intensity in the specific wavenumber range from irradiation of the laser light multiple times;
determining a ratio of the total scattering intensity in the specific wavenumber range for each time irradiation to the total scattering intensity in the specific wavenumber range for first time irradiation;
determining a correlation coefficient between the total scattering intensity in the specific wavenumber range for the first time irradiation and the total scattering intensity in the specific wavenumber range for each number of irradiation times;
identifying an upper limit of the number of irradiation times at which the sample to be analyzed is not damaged from
relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and
relationship between the number of measurements and the correlation coefficient; and
using Raman scattering light data up to the upper limit of the number of irradiation times.

2. The Raman spectroscopy analysis method as claimed in claim 1, wherein the number of measurements and at least one of the total scattering intensity for each number of irradiation times and the ratio of the total scattering intensity in the specific wavenumber range for each time irradiation to the total scattering intensity in the specific wavenumber range for the first time irradiation are plotted.

3. The Raman spectroscopy analysis method as claimed in claim 1, wherein the number of measurements and the correlation coefficient are plotted.

4. The Raman spectroscopy analysis method as claimed in claim 2, wherein linear regression analysis is performed on a plot of the number of measurements and at least one of the total scattering intensity for each number of irradiation times and the ratio of the total scattering intensity in the specific wavenumber range for each time irradiation to the total scattering intensity in the specific wavenumber range for the first time irradiation, and the upper limit of the number of irradiation times at which the sample to be analyzed is not damaged is identified from the number of measurements at which slope changes.

5. The Raman spectroscopy analysis method as claimed in claim 3, wherein linear regression analysis is performed on a plot of the number of measurements and the correlation coefficient, and the upper limit of the number of irradiation times at which the sample to be analyzed is not damaged is identified from the number of measurements at which slope changes.

6. A microscopic Raman spectroscopy device comprising:
a laser light source;
a microscopic optical unit;
a plate for fixing a sample to be analyzed;
a spectrometer; and
a Raman scattering light detection system, the microscopic Raman spectroscopy device further comprising:
a storage unit that stores the number of irradiation times of laser light and a Raman scattering light spectrum at that time,
a calculation unit that calculates total scattering intensity of Raman scattering light in a specific wavenumber range for each laser light irradiation,
a calculation unit that determines a ratio of the total scattering intensity in the specific wavenumber range for each time irradiation to the total scattering intensity in the specific wavenumber range for the first time irradiation;
a calculation unit that determines a correlation coefficient between the total scattering intensity in the specific wavenumber range for the first time irradiation and the total scattering intensity in the specific wavenumber range for each number of irradiation times;
a display unit that displays
relationship between the number of measurements and at least one of the total scattering intensity for each number of irradiation times and the ratio of the total scattering intensity in the specific wavenumber range for each time irradiation to the total scattering intensity in the specific wavenumber range for the first time irradiation, and
relationship between the number of measurements and the correlation coefficient; and
an analysis unit that identifies an upper limit of the number of irradiation times at which the sample to be analyzed is not damaged from
the relationship between the number of measurements and the at least one of the total scattering intensity for each number of irradiation times and the ratio of the total scattering intensity in the specific wavenumber range for each time irradiation to the total scattering intensity in the specific wavenumber range for the first time irradiation, and
the relationship between the number of measurements and the correlation coefficient.

7. The microscopic Raman spectroscopy device as claimed in claim 6, wherein the display unit plots and displays the number of measurements and at least one of the total scattering intensity for each number of irradiation times and the ratio of the total scattering intensity in the specific wavenumber range for each time irradiation to the total scattering intensity in the specific wavenumber range for the first time irradiation.

8. The microscopic Raman spectroscopy device as claimed in claim 6, wherein the display unit plots and displays the number of measurements and the correlation coefficient.

9. The microscopic Raman spectroscopy device as claimed in claim 6, wherein the analysis unit performs linear regression analysis of a plot of the number of measurements and at least one of the total scattering intensity for each number of irradiation times and the ratio of the total scattering intensity in the specific wavenumber range for each time irradiation to the total scattering intensity in the specific wavenumber range for the first time irradiation to identify the upper limit of the number of irradiation times at which the sample to be analyzed is not damaged.

10. The microscopic Raman spectroscopy device as claimed in claim 6, wherein the analysis unit performs linear regression analysis of a plot of the number of measurements and the correlation coefficient to identify the upper limit of the number of irradiation times at which the sample to be analyzed is not damaged.

11. The microscopic Raman spectroscopy device as claimed in claim 6 further having a function to recall and display the Raman scattering spectrum of the number of irradiation times at which the sample to be analyzed is not damaged from the storage unit.

* * * * *